United States Patent [19]

Nasu et al.

[11] Patent Number: 4,797,330
[45] Date of Patent: Jan. 10, 1989

[54] PERPENDICULAR MAGNETIC STORAGE MEDIUM

[75] Inventors: Shogo Nasu, Kobe; Koji Saiki, Toyonaka, both of Japan

[73] Assignee: Kanegafuchi Kagaku Kogyo Kabushiki Kaisha, Osaka, Japan

[21] Appl. No.: 23,039

[22] Filed: Mar. 6, 1987

[30] Foreign Application Priority Data

Mar. 18, 1986 [JP] Japan .................................. 61-60184
Sep. 22, 1986 [JP] Japan ................................. 61-224214

[51] Int. Cl.⁴ .............................................. G11B 5/64
[52] U.S. Cl. ..................................... 428/694; 428/702; 428/900
[58] Field of Search ....................... 428/694, 702, 900

[56] References Cited

U.S. PATENT DOCUMENTS 4,362,767  12/1982  Nouchi et al. ....................... 428/900
4,661,418  4/1987  Yanai et al. ......................... 428/900

FOREIGN PATENT DOCUMENTS 122030  10/1984  European Pat. Off. .
152517  9/1982  Japan .
198707  11/1984  Japan .
59-215025  12/1984  Japan .
35328  2/1985  Japan .

OTHER PUBLICATIONS

M. Ohkoshi et al., IEEE Transaction on Magnetics, vol. MAG-20, No. 5, Sep. 1984, pp. 788-790.
K. Nakamura et al., Japanese Journal of Applied Physics, vol. 23, No. 6, Jun. 1984, pp. L397-L399.
N. Akutsu et al., IEEE Transaction on Magnetics, vol. MAG-22, No. 5, Sep. 1986, pp. 1170-1172.

*Primary Examiner*—Paul J. Thibodeau
*Attorney, Agent, or Firm*—Armstrong, Nikaido, Marmelstein & Kubovcik

[57] ABSTRACT

A perpendicular magnetic storage medium comprising a substrate and a perpendicular magnetic anisotropic film formed on the substrate, characterized in that the perpendicular magnetic anisotropic film is a film of a sub-oxide of a metal having a composition described by a general formula $[(Fe_{1-x}Co_x)_{1-y}M_y]_{1-z}O_z$ [where $0.01 \leq x \leq 0.75$, $0 \leq y \leq 0.30$, $0.05 \leq z \leq 0.50$ and M means at least one metal excluding Fe and Co.]; and has an easy magnetization axis being perpendicular to a plane thereof, and both a peak of diffracted X-ray intensity caused by oxidized Fe and a peak of diffracted X-ray intensity caused by metal state Fe and Co and Metal M observed in X-ray diffraction spectrum.

The perpendicular magnetic storage medium of the present invention can be produced easily and economically at a low substrate temperature, and has high wear resistance, high recording/reproducing sensitivity and high recording density.

6 Claims, 15 Drawing Sheets

PERPENDICULAR MAGNETIC STORAGE MEDIUM

BACKGROUND OF THE INVENTION

The present invention relates to a perpendicular magnetic storage medium and more particularly to a perpendicular magnetic storage medium used in a form of a card, a tape, a disc or the like, wherein there is formed a perpendicular magnetic anisotropic film made of (1) a sub-oxide of a metal comprising Fe and Co, or (2) a sub-oxide of a metal comprising Fe, Co and at least one metal other than the above two, which is suitable for high density recording.

Hitherto, a perpendicular magnetic storage medium is effectively used for a high-density mangetic storage. A magnetic storage medium used for such a purpose utilizes a magnetic thin film which has an easy magnetization axis being perpendicular to the plane of the film. As a magnetic film for the above use, there have been used or researched a thin film of Co-Cr (Co-Cr alloy), $Fe_3O_4$ or $O_s$-$\gamma Fe_2O_3$ produced by sputtering method or vacuum deposition method, a thin film of barium-ferrite produced by coating method or sputtering method, and the like.

Further, in order to improve the recording/reproducing sensitivity of a magnetic thin film, it has been proposed to apply a double layer film construction, wherein a soft magnetic layer is provided between the substrate and the perpendicular magnetic anisotropic film, in a perpendicular magnetic storage medium. The above proposal is given in Japanese Examined Patent Publication No. 91/1983. For instance, a perpendicular magnetic storage medium with the double layer film construction which uses a perpendicular magnetic anisotropic film of Co-Cr has a ten times higher recording/reproducing sensitivity than that uses the same film but with single layer construction.

However, the above conventional perpendicular magnetic storage mediums have drawbacks as described hereinafter.

The magnetic thin film of Co-Cr alloy used in the above conventional medium is required to have a structure close to a single crystal. Therefore, a substrate, on which the magnetic thin film is formed, should be heated to higher than 100° C. or frequently higher than 200° C. during the deposition thereon. This requires the use of heat-resistant substrate and consequently increases the production cost. Further, a film of metal has an intrinsic drawback that it is apt to be worn out.

The magnetic thin film of the metal oxide such as $Fe_3O_4$ and $O_s$-$\gamma Fe_2O_3$ is hard and has a high wear resistance. But, since a substrate for the magnetic thin film of $Fe_3O_4$ or $O_s$-$\gamma Fe_2O_3$ is also required to be heated to higher than 250° C. during the deposition thereon, the production cost is increased like that of the above Co-Cr alloy film. Further, the metal oxide such as $O_s$-$\gamma Fe_2O_3$ or the like used for the magnetic thin film is sometimes required reduction process. Still further, the perpendicular magnetic storage medium using these magnetic thin films of the metal oxide has a drawback that the saturation magnetization (Ms) is low and therefore there cannot be obtained mediums having high recording/reproducing sensitivity.

The thin film of barium-ferrite obtained by coating method for the perpendicular magnetic storage medium requires to provide barium-ferrite powder having a uniform particle diameter of about 0.1 μm during the forming of the film. Accordingly, the production cost is increased. Further, because a binder is required to be added to form a film, the content of barium-ferrite in the film is lowered. This causes a low saturation magnetization (Ms) of the magnetic thin film, and consequently lowers the performance of the magnetic storage medium.

The thin film of barium-ferrite obtained by sputtering method has a higher saturation magnetization than the film by coating method, but a substrate therefor should be heated to about 500° C. Accordingly, the substrate must be highly heat resistant, and the use of an inexpensive plastic substrate is not allowed.

The perpendicular magnetic storage medium having a double layer film construction, wherein a soft magnetic film is provided between the substrate and a perpendicular magnetic anisotropic film so that the recording/reproducing sensitivity in recording an information into the magnetic thin film and reproducing it out of the film can be improved, also has a drawback, because the specifications of the two films often restrict each other due to each individual characteristics as a crystal. For example, in a perpendicular magnetic anisotropic film of Co-Cr alloy, the crystal axis hcp <001> is required to be oriented perpendicuarly to the film surface, and for this purpose, the soft magnetic film should be strictly specified in a kind of a material, a configuration of a crystal, a lattice constant and a degree of orientation.

As an effective way to remove the above drawbacks, there is proposed a perpendicular magnetic anisotropic film of a sub-oxide of Co. This film can be formed at a low sbstrate temperature, so the use of a low heat resistant and inexpensive film substrate is allowed. And this perpendicular magnetic anisotropic film has a high perpendicular magnetic anisotropy, whereby a perpendicular magnetic anisotropic film having a high saturation magnetization (Ms) can be obtained. But, there is a problem that a perpendicular magnetic anisotropic film of a sub-oxide of Co does not have a high recording/reproducing sensitivity.

Further, we inventors have proposed a perpendicular magnetic anisotropic film of a sub-oxide of Fe. This film can also be formed at a low substrate temperature. But the film of a sub-oxide of Fe does not have either a sufficient perpendicular magnetic anisotropy, or a large saturation magnetization (Ms).

Still further, there has been proposed, a perpendicular magnetic anisotropic film of a sub-oxide of Co—Fe, or Co—Fe—Ni. This film can be produced at a low substrate temperature. But the recording/reproducing sensitivity thereof is not high.

It should be noted that the perpendicular magnetic anisotropic film of the above sub-oxides have advantages of high flexibility due to metals contained therein and high wear resistance.

The present invention was made to solve the above mentioned problem existing in the conventional perpendicular magnetic anisotropic films themselves, and the problem that a perpendicular magnetic anisotropic film and a soft magnetic layer are mutually restricted, and an object of the present invention is to provide a perpendicular magnetic storage medium having a perpendicular magnetic anisotropic film, which can be produced easily and economically at a low substrate temperature, and also which has high wear resistance, high oxidation resistance, high recording/reproducing sensitivity and high recording density, and further which requires less reciprocal restrictions with a soft magnetic layer in applying a double layer construction wherein the soft magnetic layer is used.

SUMMARY OF THE INVENTION

In accordance with the present invention, there is provided a perpendicular magnetic storage medium comprising a substrate and a perpendicular magnetic anisotropic film formed on the substrate, wherein the perpendicular magnetic anisotropic film is a film of a sub-oxide of a metal having a composition described by a general formula $[(Fe_{1-x}Co_x)_{1-y}M_y]_{1-z}O_z$ (where $0.01 \leq x \leq 0.75$, $0 \leq y \leq 0.30$, $0.05 \leq z \leq 0.50$ and M means at least one metal excluding Fe and Co.); and has an easy magnetization axis bein perpendicular to the plane thereof, and both a peak of diffracted X-ray intensity caused by oxidized Fe and a peak of diffracted X-ray intensity caused by Fe and Co in metal state.

In the above sub-oxide, most of Co remains in a metal state and some of Fe becomes FeO.

The perpendicular magnetic anisotropic film might contain a metal M as a third component to improve the oxidation resistance thereof. In particular, when Cr, Mo, Ti or Zr is employed to be added to Fe and Co, the oxidation resistance of the perpendicular magnetic anisotropic film can be considerably improved. The other metal than the above mentioned can be added as far as it does not cancel the desirable characteristics of the perpendicular magnetic storage medium of the present invention.

In forming the perpendicular magnetic anisotropic film in the present invention, the rf-sputtering method or the rf-magnetron sputtering method is especially effective.

Further, when a double layer construction, wherein a soft magnetic layer is provided between the substrate and the perpendicular magnetic anisotropic film, is applied to the perpendicular magnetic storage medium of the present invention, the recording/reproducing sensitivity is further improved.

DETAILED DESCRIPTION

There is explained hereinafter a perpendicular magnetic anisotropic film in the present invention. The macroscopic construction thereof is firstly explained.

The perpendicular magnetic anisotropic film in the present invention can be described by a general formula $[(Fe_{1-x}Co_x)_{1-y}M_y]_{1-z}O_z$. A large perpendicular magnetic anisotropy of the film can be obtained when "x" and "z" satisfy the relationships of $0.01 \leq x \leq 0.75$ and $0.05 \leq z \leq 0.50$ respectively.

The preferable value of the above x, namely a ratio of the number of Co atoms to the total number of Fe atoms and Co atoms in the film, differs depending on the value of the above z, namely a ratio of oxygen atoms in the film. A suitable amount of Co atoms in the film increases a perpendicular anisotropic magnetic field (Hk), saturation magnetization (Ms) and perpendicular coercive force (Hc⊥) of the film, compared with a perpendicular magnetic anisotropic film composed solely of a sub-oxide of Fe. However, an excessive value of the above x will decrease the perpendicular coercive force (Hc⊥), the saturation magnetization (Ms) and the perpendicular anisotropic magnetic field (Hk), and also causes an undesirable perpendicular rectangular characteristics, consequently the required functions as a perpendicular magnetic anisotropic film are lost.

Figure 1:
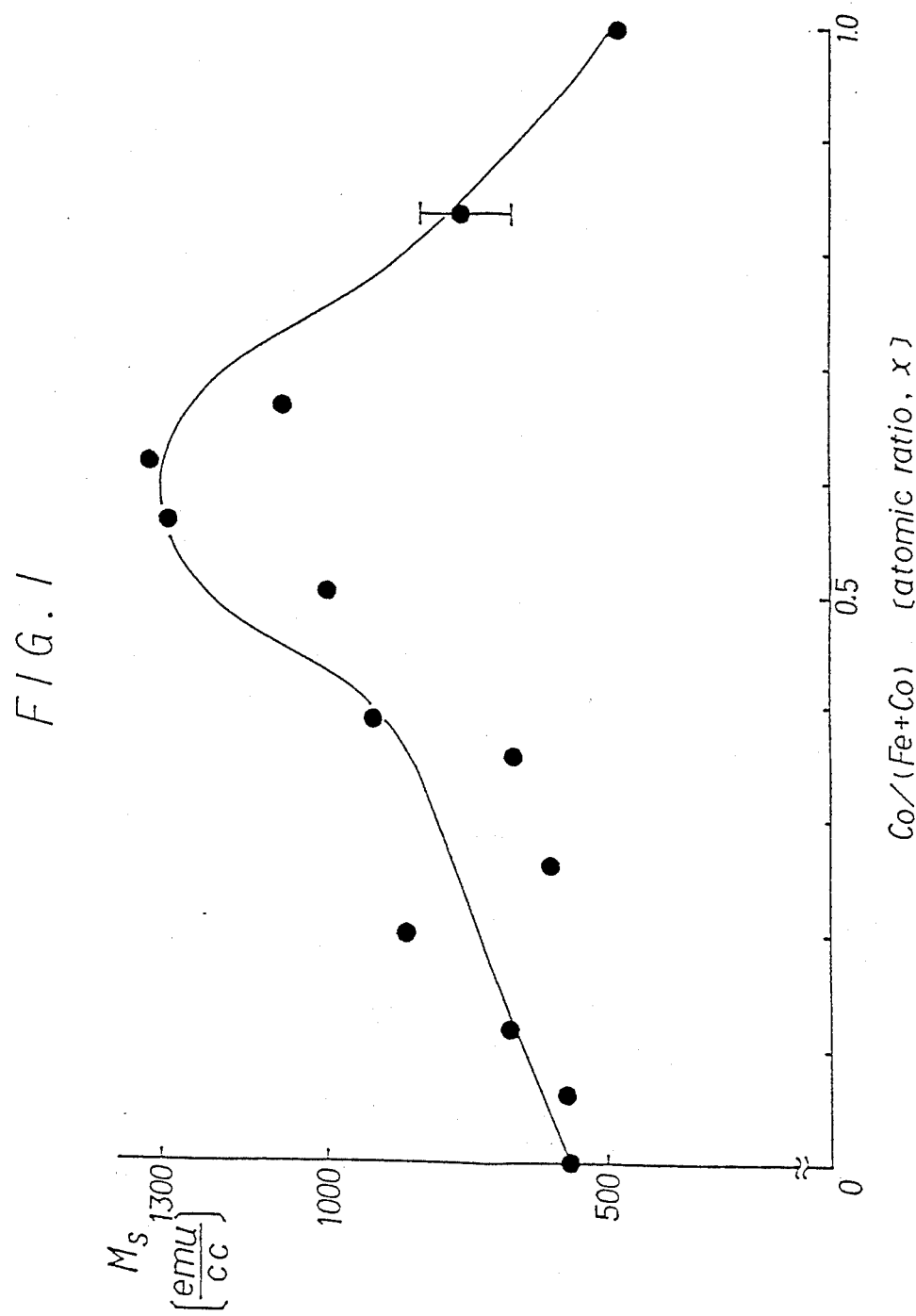
FIG. 1 is a graph showing a relationship between a saturation magnetization (Ms) and a ratio of Co (atomic ratio x) to a total amount of Fe and Co in a perpendicular magnetic anisotropic film which is formed by means of sputtering method under a condition that a partial pressure of $O_2$ is $4.5 \times 10^{-4}$ Torr.
Figure 2:
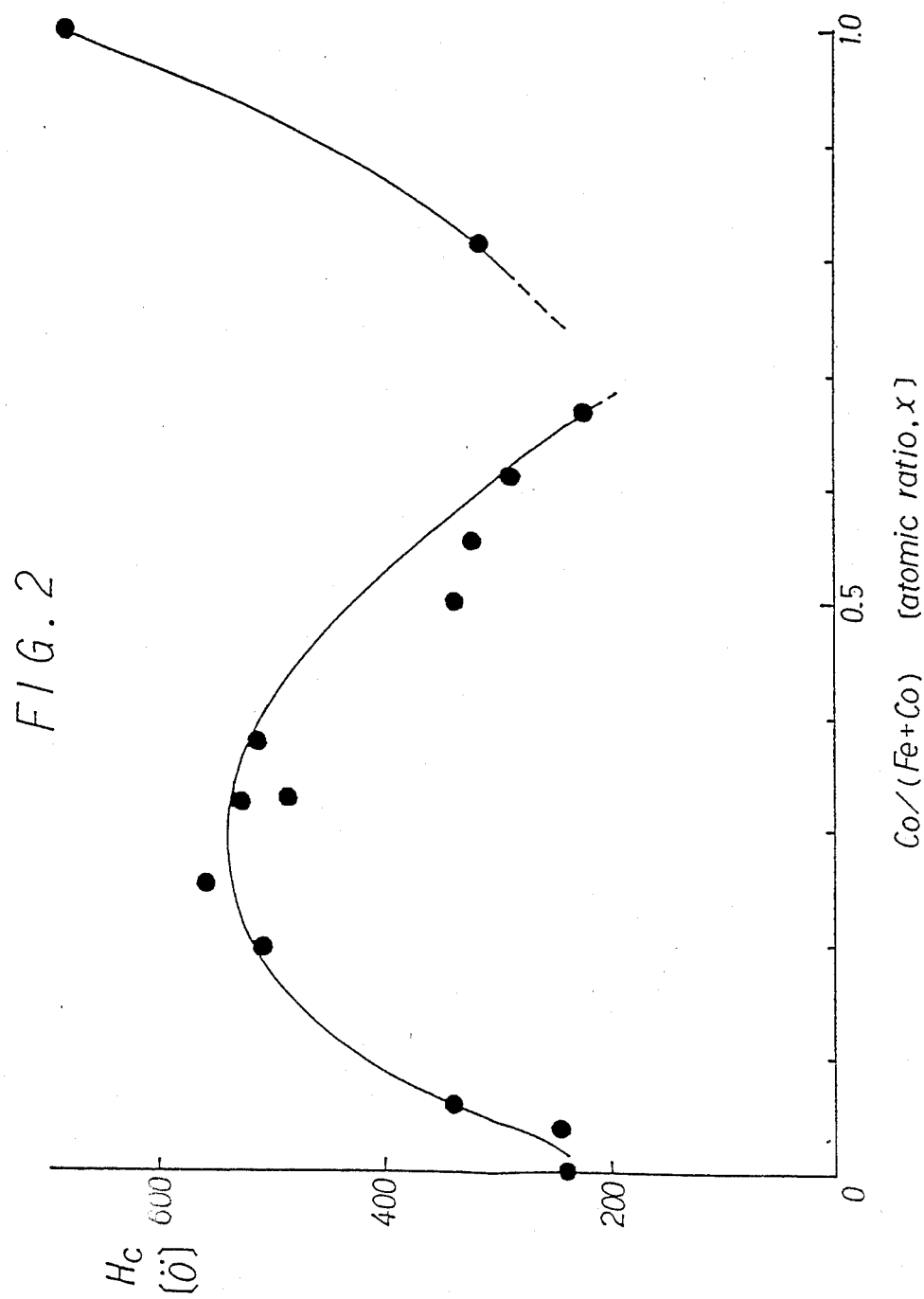
FIG. 2 is a graph showing a relationship between a perpendicular coercive force (Hc⊥) and a ratio of Co (atomic ratio x) in a perpendicular magnetic anisotropic film formed under the same condition as in FIG. 1.
Figure 3:
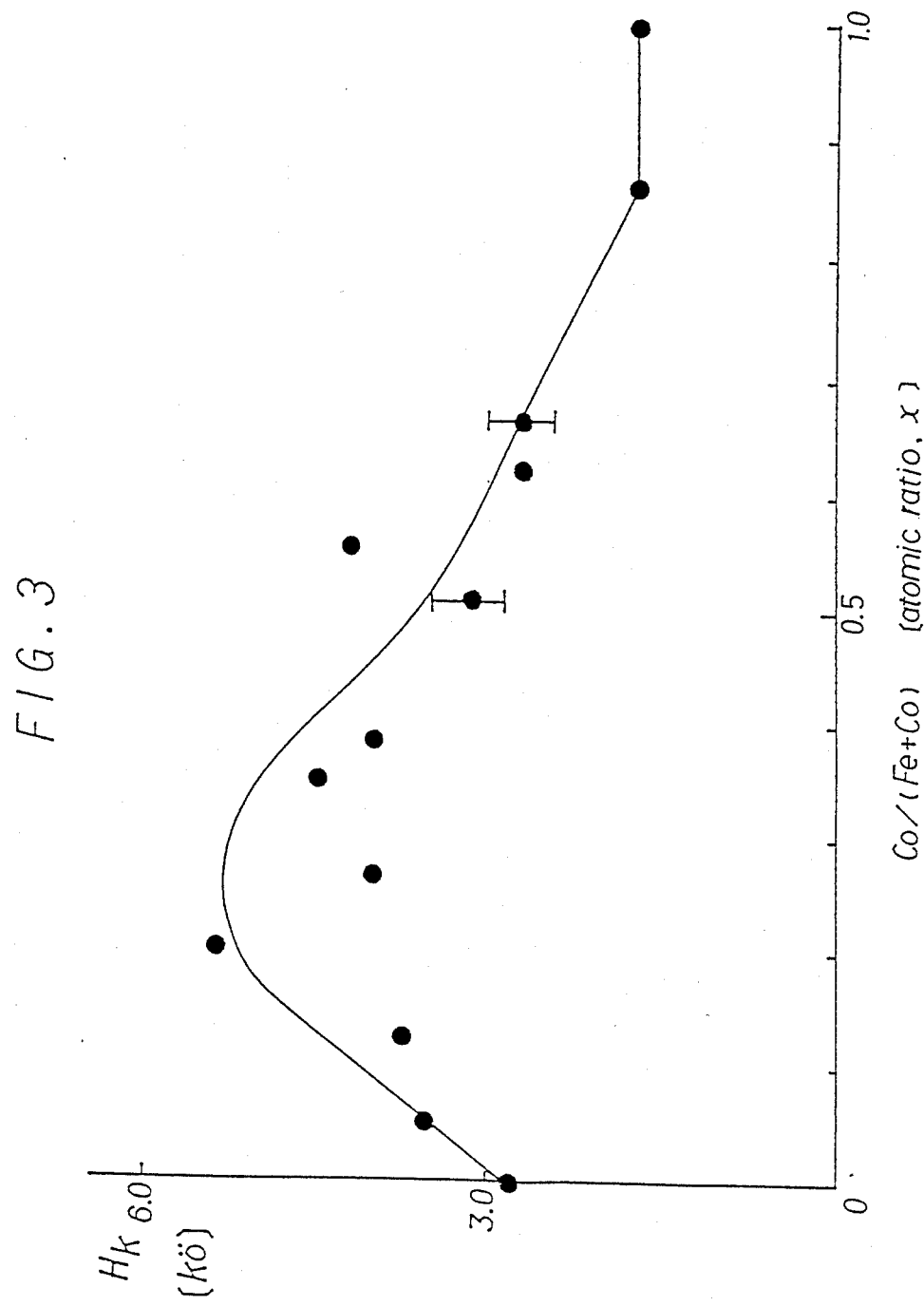
FIG. 3 is a graph showing a relationship between a perpendicular anisotropic magnetic field (Hk) and a ratio of Co (atomic ratio x) in a perpendicular magnetic anisotropic film formed under the same condition as in FIG. 1.

These facts can be observed from FIGS. 1 to 3. FIGS. 1 to 3 respectively illustrate changes of values of the saturation magnetization (Ms), the perpendicular coercive force (Hc⊥) and the perpendicular anisotropic magnetic field (Hk) of the perpendicular magnetic anisotropic film corresponding to the change in x, i.e. a ratio of the number of Co atoms to the total number of Fe atoms and Co atoms, under a condition that a partial pressure of oxygen is $4.5 \times 10^{-4}$ Torr.

The preferable range of x differs depending on the value of z which corresponds to the partial pressure. However, generally speaking, the maximum value of preferable x is about 0.75, and a particularly preferable range of x is from about 0.2 to about 0.6.

Figure 4:
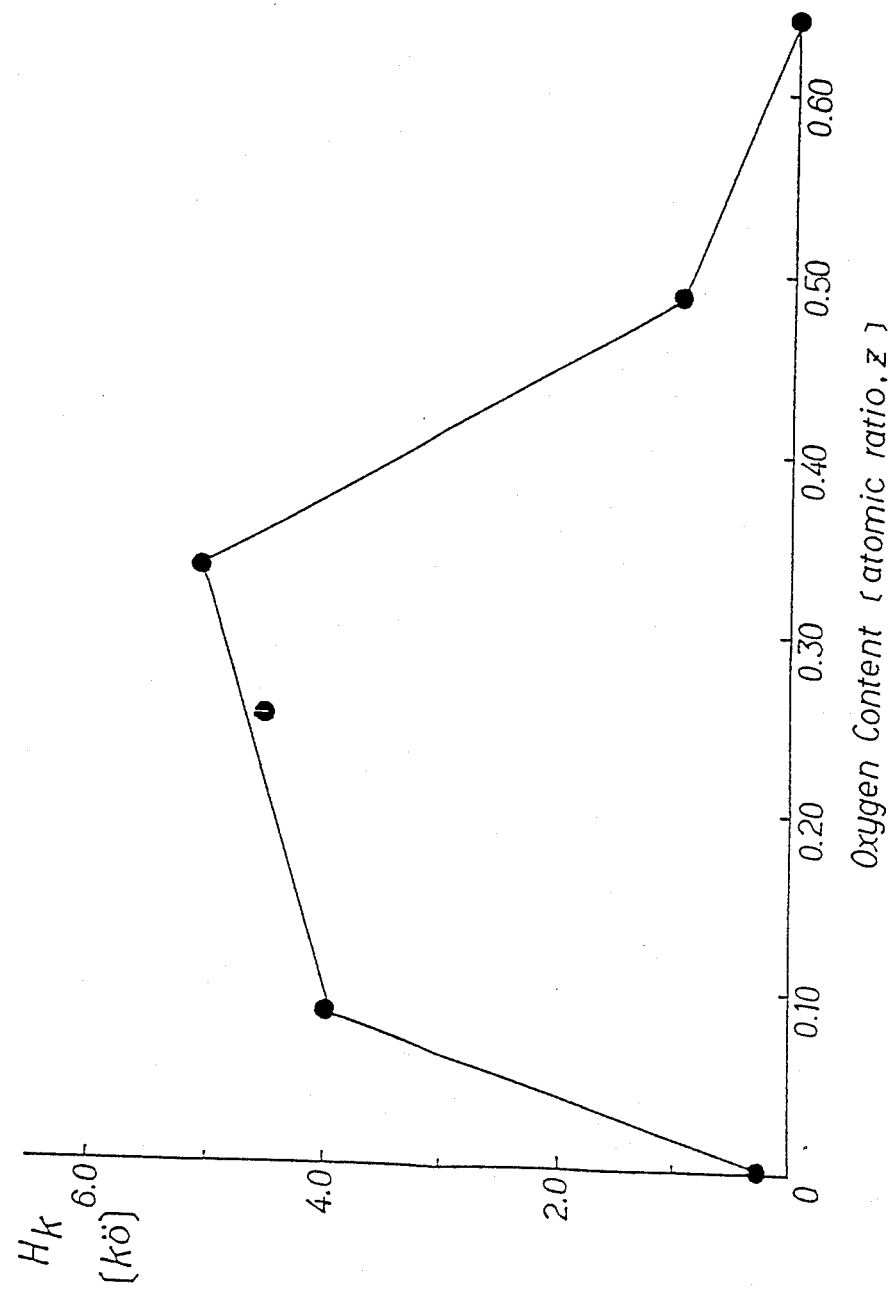
FIG. 4 is a graph showing a relationship between a perpendicular anisotropic magnetic field (Hk) and a content of oxygen (atomic ratio z) in a perpendicular magnetic anisotropic film wherein a ratio of Co to a total amount of Fe and Co is 0.3 atomic ratio (x)
Figure 5:
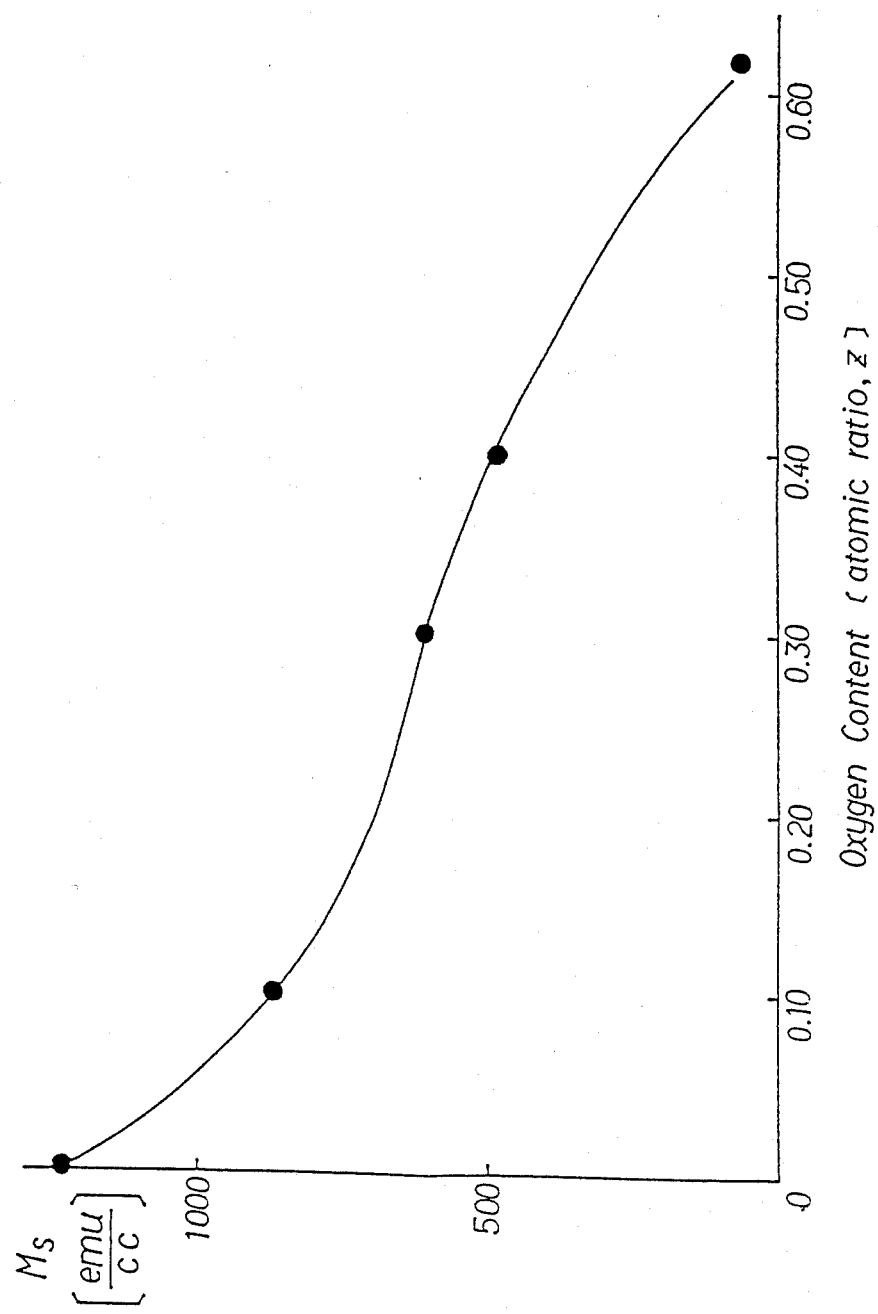
FIG. 5 is a graph showing a relationship between a saturation magnetization (Ms) and a content of oxygen (atomic ratio z) in a perpendicular magnetic anisotropic film formed under the same condition as in FIG. 4.
Figure 6:
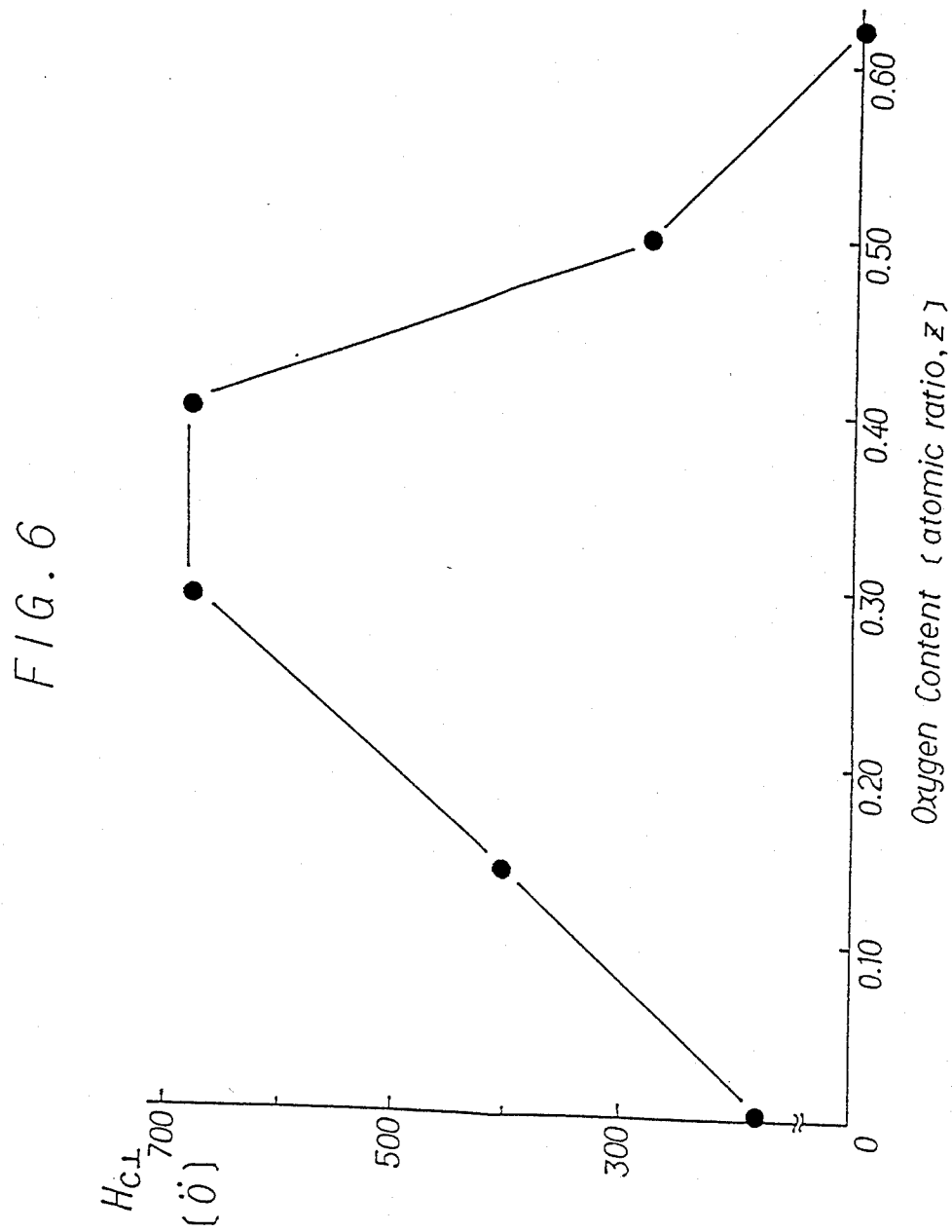
FIG. 6 is a graph showing a relationship between a perpendicular coercive force (Hc⊥) and a content of oxygen (atomic ratio z) in a perpendicular magnetic anisotropic film formed under the same condition as in FIG. 4.

Vice versa, the preferable range of z differs depending on the value of x. However, generally speaking, the value of z larger than about 0.50 causes too low saturation magnetization (Ms) of the perpendicular magnetic anisotropic film. On the other hand, the value of z smaller than about 0.05 generally causes weak perpendicular anisotropic magnetic field (Hk) and the film loses the perpendicular magnetic anisotropy. Generally, the preferable range of z is from about 0.1 to about 0.4. These facts are supported by FIGS. 4 to 6 which show the correlations between the oxygen content z and the above properties, i.e. perpendicular anisotropic magnetic field (Hk), saturation magnetization (Ms) and perpendicular coercive force (Hc⊥) under the fixed x of 0.3. The most preferable range of z can be determined by a state of sub-oxidation of Fe-Co in the above preferable range. Namely, the most preferable range of z is such range that provides the condition where more than 80% of Co is in a metal state and at least more than about 30% of Fe is oxidized to form FeO as mentioned later.

The above condition of sub-oxidation can be known by analyzing, using X-ray photoelectron spectroscopy (XPS) method, perpendicular magnetic anisotropic films comprising sub-oxides of Fe, Co and metal M prepared with different values of z.

For the above purpose, an experiment was carried out as described below.

There were produced four samples wherein value of x was fixed as 0.55 for all samples, value of y was 0 and values of z were 0.09, 0.12, 0.19 and 0.33 respectively, and then these samples were analized using XPS method. The value of z can be controlled by varying partial pressure of oxygen when forming the above samples i.e. perpendicular magnetic anisotropic films by means of sputtering method.

The above samples were etched to a depth of about 300 Å below the film surfaces by using argon-ion-beam prior to XPS analyzing in order to remove the oxides on the film surfaces.

Figure 7A:
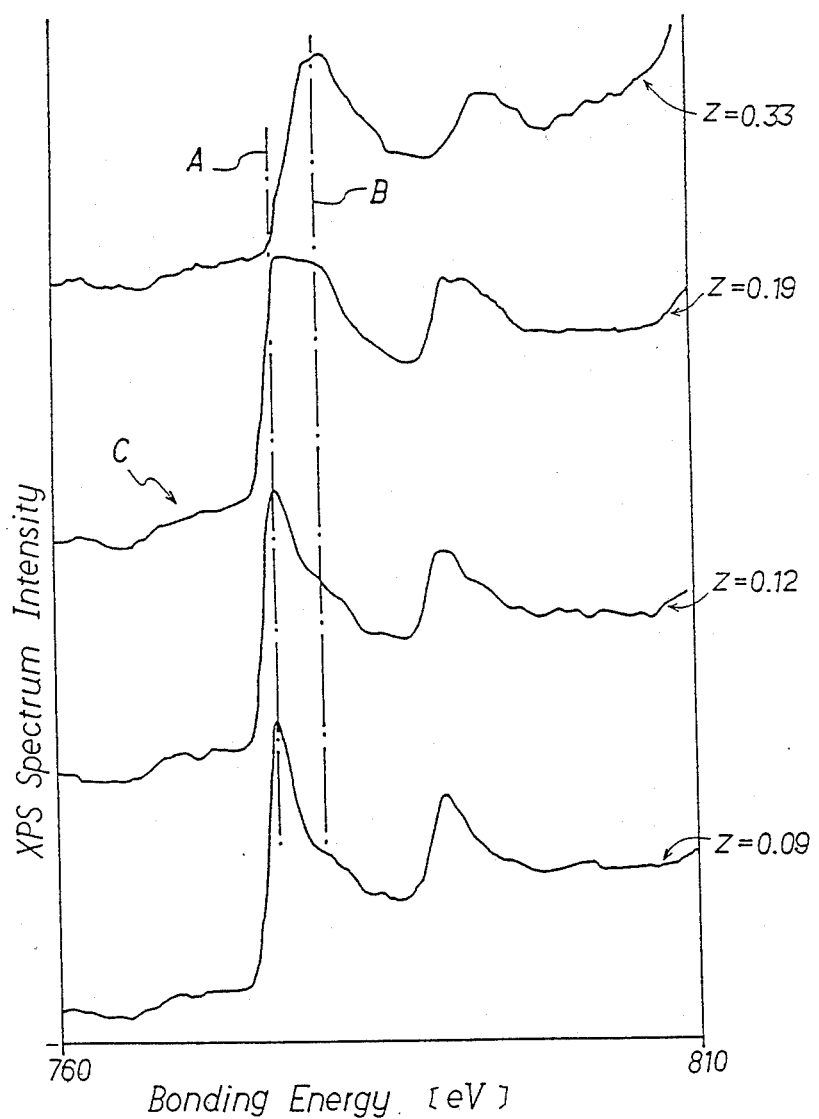
FIG. 7a is a graph showing a result of spectrum analysis of Fe by means of XPS method in the perpendicular magnetic anisotropic film of the present invention, wherein a ratio of Co (X) is 0.55 and a ratio of oxygen (Z) changes.
Figure 7B:
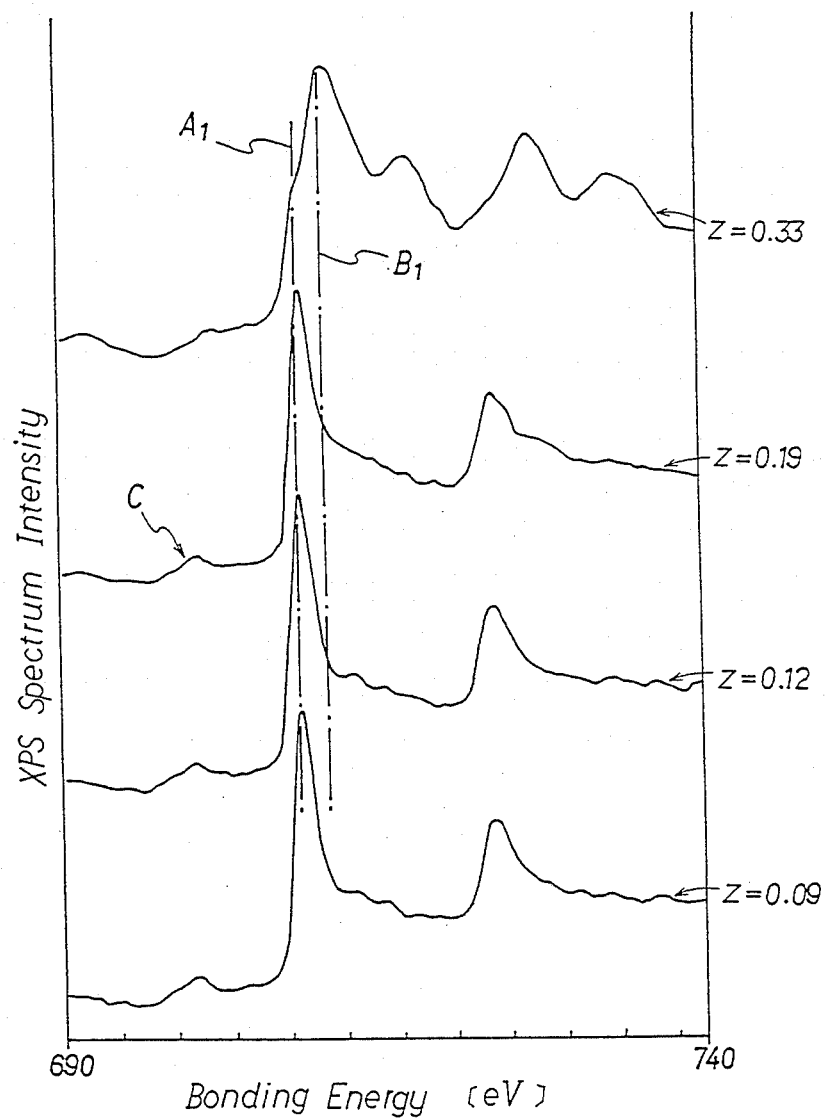
FIG. 7b is a graph showing a result of spectrum analysis of Co by means of XPS method in the perpendicular magnetic anisotropic film of the present invention, wherein a ratio of Co (X) is 0.55 and a ratio of oxygen (Z) changes.

The spectra of Fe and Co 2p orbits in the above samples which were analyzed by XPS method are shown in FIG. 7a and FIG. 7b.

In FIG. 7a, the spectrum intensity has a peak of the spectrum intensity caused by electron orbit 2p 3/2 of 0-valent Fe (Fe in a metal state) at a position indicated with line A and a peak of the spectrum intensity caused by the electron orbit 2p 3/2 of bivalent or trivalent Fe at a position indicated with line B.

In FIG. 7b, the spectrum intensity has a peak of the spectrum intensity caused by an electron orbit 2p 3/2 of 0-valent Co (Co in a metal state) at a position indicated with line Al and a peak of the spectrum intensity caused by an electron orbit 2p 3/2 of bivalent or trivalent Co at a position indicated with line Bl.

The ratios of the oxides respectively in Fe and in Co can be known from these peak values of the spectrum intensity. The ratio of oxygen atoms in the film, i.e. the value of z, can be known by the peak values caused by the electron orbit 3p 3/2 of Fe, the electron orbit 3p 3/2 of Co and the electron orbit 1s of oxygen obtained from these spectra, and by considering a sensitivity correction value to compensate the characteristics of the measuring device.

The ratios of the oxides respectively in Fe and in Co contained in the four samples, of which ratios correspond to the values of z, are shown in Table 1.

TABLE 1

| Value z | Ratio of oxide in Fe | Ratio of oxide in Co |
|---|---|---|
| 0.09 | about 15% | 0 |
| 0.12 | about 25% | 0 |
| 0.19 | about 40% | about 7% |
| 0.33 | about 95% | about 85% |

Figure 8:
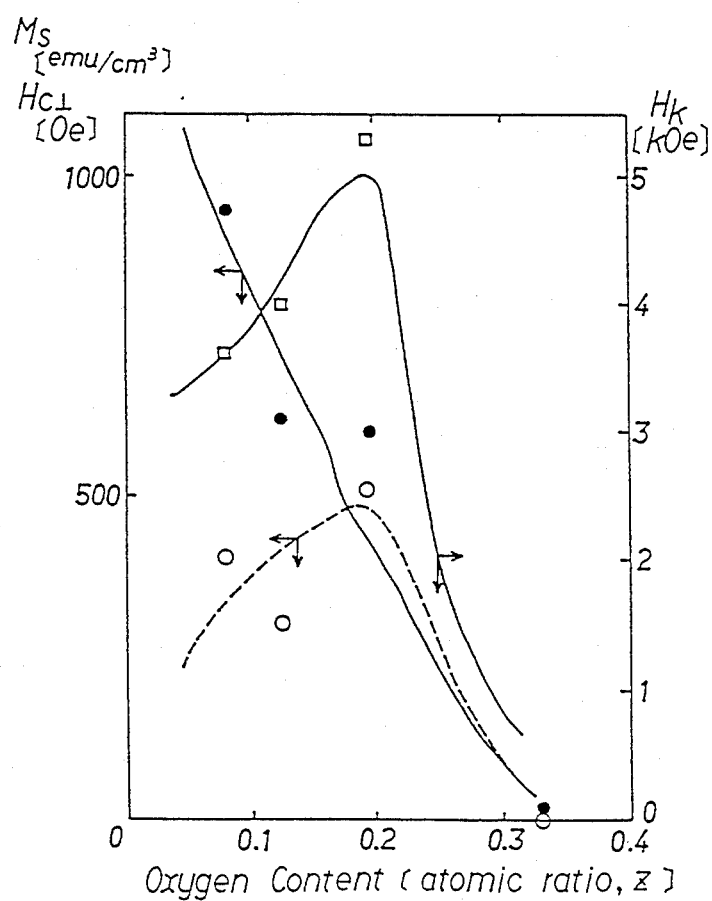
FIG. 8 is a graph showing values of saturation magnetization (Ms), perpendicular coercive force (Hc⊥) and saturation magnetization (Hk) of the perpendicular magnetic anisotropic film of the present invention, wherein a ratio of Co (X) is 0.55 and a ratio of oxygen (Z) changes.

FIG. 8 shows the relationship between the value of z in these samples and the magnetic properties thereof i.e. the saturation magnetization (Ms), the perpendicular coercive force (Hc⊥) and the perpendicular anisotropic magnetic field (Hk).

In FIG. 8, it is observed that the perpendicular anisotropic magnetic field (Hk) and coercive force (Hc⊥) has a peak at z=0.19, while the saturation magnetization (Ms) of a magnetic film monotonously decreases with the proceeding of oxidation. Thus the maximum perpendicular magnetic anisotropy among these samples is obtained when about 40% of Fe is oxidized and most of Co remains unoxidized.

It should be reminded that the optimum value of z differs depending on the value of x. In the above experiment where x is 0.55, the optimum z is about 0.20. However, when x is 0.10, the optimum z becomes about 0.35, or when x is 0.33, the optimum z becomes about 0.30.

In all the above cases, it is preferable that most of, i.e. 80% or more of Co remains unoxidized and in a metal state, and appreciable part of Fe is oxidized. The range of the optimum z is approximately from 0.10 to 0.40 for the above values of x.

It is found that the oxidized Fe in these films is FeO from spectrum analysis utilizing Mössbauer effect. FeO is antiferromagnetic or paramagnetic at an ambient temperature and is not ferromagnetic.

Next, there is explained an additional metal M in the present invention. The film in the present invention might contain the metal M, but of course it might not contain the same. The additional metal M is at least one metal excluding Fe and Co. The preferable metal M is at least one metal selected from the group consisting of Al, Cr, Mo, Ti and Zr. In case of these five kinds of metal, there can be obtained a film having further improved oxidation resistance. The preferable content of the metal M in a film is not more than about 30 atomic % to the total metalic atoms therein.

To use the additional metal M is effective in improving the oxidation resistance of a perpendicular magnetic anisotropic film, but the perpendicular magnetic anisotropy and the perpendicular coercive force are lowered, if it is used excessively.

When the metal M is uniformly distributed in a perpendicular magnetic anisotropic film, the metal M content of less than about 1 atom % provides almost no improvement in the oxidation resistance.

However, when the metal M is concentrated at the film surface exposed to the atmosphere by forming a layer containing metal M at the surface or by making concentration gradient perpendicularly to the film, the overall metal M content can be lowered to below 1 atom %. For instance, when the local metal M content at the film surface is more than about 1 atom %, a satisfactory improvement in oxidation resistance is obtained even if the overall metal M content is about 0.1 atom %.

The ratio of oxygen atoms in the film, namely "z", in the specification is a value obtained by X-ray photoelectron spectroscopy (XPS) method from the film being etched in a depth of about 300 Å at the film surface using an argon-ion-beam then not being exposed to the atmosphere. The above etching is a selecting etching, so the value z might differ from that obtained by other method than the above.

The ratio of a metal component in the film can be obtained by the fluorescence X-ray method, X-ray microanalyzer (XMA) method, X-ray photoelectron spectroscopy method, Auger electron spectroscopy method or the like.

The above descriptions are summarized here. The maximum perpendicular magnetic anisotropy of the perpendicular magnetic anisotropic film in the present invention is obtained when the ratio of the number of Co atoms to the total number of Co atoms and Fe atoms, namely "x", is within a range of 0.01–0.75, and simultaneously, about 30% or more of Fe is in FeO and also the residual Fe and about 80% or more of Co remain in metal states.

It is presumed that the perpendicular magnetic anisotropy of the above perpendicular magnetic anisotropic film is provided by virtue of the shape anisotropy of the film structure wherein metal state needle-shaped Fe and Co are disposed perpendicularly to the film surface and are surrounded by paramagnetic FeO.

It is apparent that the magnetic property of the perpendicular magnetic anisotropic film in the present invention is provided by metal state Fe and Co, since FIG. 8 shows that with increasing in the ratio of oxygen atoms (z), the saturation magnetization (Ms) continues to lower. It is very important in providing the magnetic anisotropy that Co which is ferromagnetic is resistant against the oxidation compared with Fe.

Excepting the metal M, the perpendicular magnetic anisotropic film in the present invention is a film composed of Fe, Co, oxidized Fe and oxidized Co. However, a film substantially consisting of three components, namely Fe, Co and FeO is most preferable.

The perpendicular magnetic anisotropic film in the present invention has a sufficient saturation magnetization (Ms), an enough perpendicular anisotropic magnetic field (Hk) and a proper perpendicular coercive force (Hc⊥), of which properties are required in a perpendicular magnetic storage medium. Namely, the film has Ms of about 350–1300 [emu/cm$^3$], Hk of about 2–6 [kOe] and Hc of about 200–1500 [Oe]. These values are not inferior to those of the conventional perpendicular magnetic anisotropic film of Co-Cr alloy.

The perpendicular magnetic anisotropic film in the present invention is superior in the friction coefficient and the wear resistance thereof to the conventional perpendicular magnetic anisotropic film of Co-Cr alloy. That is quite an important characteristic in a perpendicular magnetic storage medium wherein the film is driven in contact with a magnetic head.

Further, by virtue of the existence of the metal M, the perpendicular magnetic anisotropic film has an important advantage in the oxidation resistance.

The description given hereinbefore is a macroscopic construction concerning the composition of the perpendicular magnetic anisotropic film in the present invention. The magnetic properties of the film, shown in for example FIG. 8, is provided by virtue of the above macroscopic construction. In addition to that, the microscopic construction of the film is also important in the present invention.

Now, there is explained the microscopic construction of the perpendicular magnetic anisotropic film in the present invention.

In order to obtain a high recording/reproducing sensitivity, the perpendicular magnetic anisotropic film should not only have the above mentioned magnetic property by satisfying the above mentioned compositional requirements but also be prepared under properly selected conditions.

When the perpendicular magnetic anisotropic film in the present invention is analyzed by X-ray diffraction spectrum, two kinds of peaks of diffracted X-ray intensity are observed.

It is presumed that one of them is caused by a diffraction due to a lattice plane of miller index (200) having a lattice spacing of 2.13–2.16 Å mainly in a cubic crystalline FeO, and another is caused by a diffraction due to a lattice plane of miller index (110) having a lattice spacing of 2.02–2.08 Å in Fe, Co, Metal M and these alloy having a body-centered cubic structure.

The other kind of peak than the above is not observed substantially. This means that the axis <200> orients perpendicularly to the film surface in FeO, while the axis <110> orients perpendicularly to the film surface in a metal phase.

Figure 9:
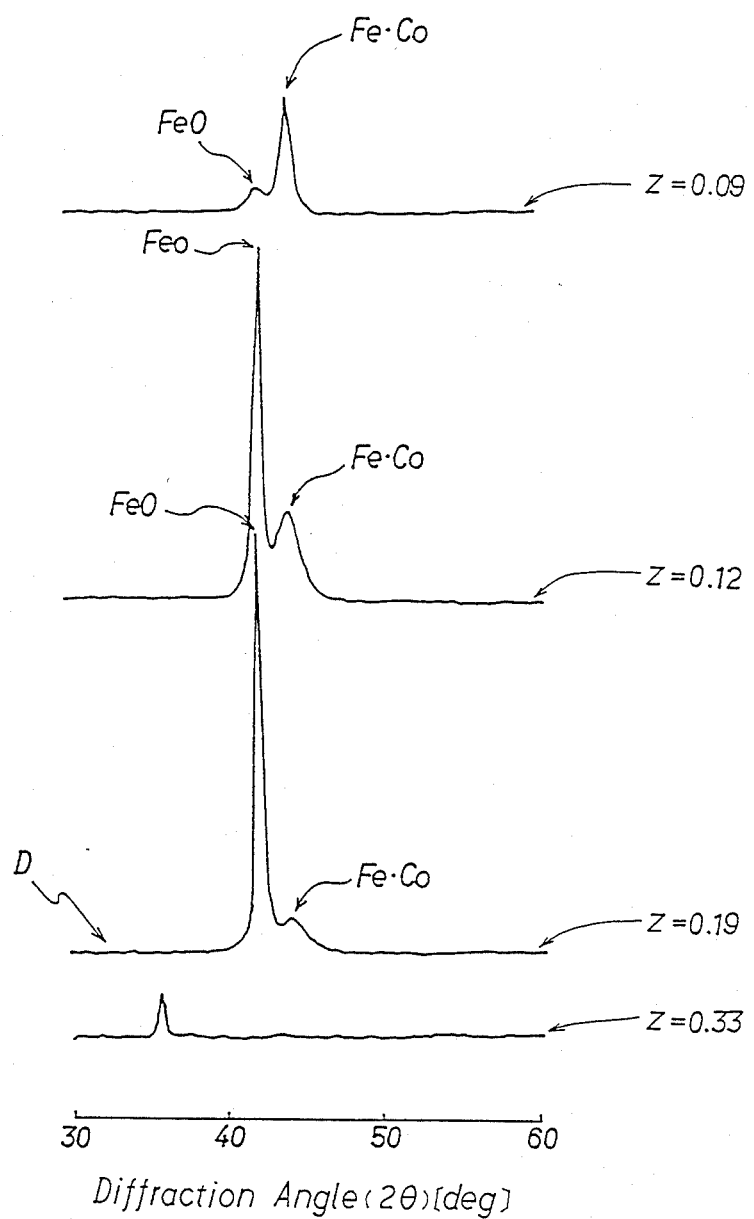
FIG. 9 is a graph showing a result of X-ray diffraction spectrum of the perpendicular magnetic anisotropic film of the present invention, wherein a ratio of Co (X) is 0.55 and a ratio of oxygen (Z) changes.

The change in the diffracted X-ray intensit observed by X-ray diffraction spectrum on the perpendicular magnetic anisotropic films with varing the ratio of oxygen (z) is shown in FIG. 9. Generally, the perpendicular magnetic anisotropy shows as a tendency to be increased when the peak of diffracted X-ray intensity caused by FeO is higher than the peak caused by Fe and Co in a metal state. The result of X-ray diffraction spectrum shown in FIG. 9 does not conflict with the result of the analysis by XPS method shown in FIG. 7a and FIG. 7b.

On the contrary, when a perpendicular magnetic anisotropic film, which has the similar composition and the similar magnetic property to the film according to the present invention but does not provide a sufficient recording/reproducing sensitivity, is analyzed by X-ray diffraction spectrum, a different result is obtained. Namely, a peak of diffracted X-ray intensity being presumed to be caused by Fe, Co, Metal M or an alloy thereof having a body-centered structure is not observed. Also, sometimes, a peak being pressumed to be caused by cubic crystalline FeO is not observed.

It is presumed that, in the perpendicular magnetic anisotropic film in the present invention having a high recording/reproducing sensitivity, needle-shaped crystal of metal state Fe, Co and Metal M grows perpendicularly to the film surface and reaches the film surface, but on the other hand, in a perpendicular magnetic anisotropic film not having a sufficient recording/reproducing sensitivity, needle-shaped crystal of metal state Fe, Co and Metal M grows perpendicularly to the film surface but does not reach the film surface and is dispersed and buried in the FeO phase.

Therefore, in the perpendicular magnetic anisotropic film in the present invention, it is an essential element that both a peak of diffracted X-ray intensity caused by FeO and a peak of diffracted X-ray intensity caused by metal state Fe Co and Metal M are observed in X-ray diffraction spectrum.

The rf-sputtering method or rf-magnetron sputerring method is especially effective in producing a perpendicular magnetic anisotropic film having the above construction.

Next, there is explained a method of producing a perpendicular magnetic anisotropic film in the present invention on a substrate by means of rf-magnetron sputtering method. The sputtering conditions are required to be selected adequately in order to obtain a desirable perpendicular magnetic anisotropic film. Low substrate temperature is preferable in producing the film, particularly the range of about $-50°$ C. to $100°$ C. is preferable.

A target used in the above sputtering is a composite target of Fe, Co and the metal M; a target of an alloy of these metals; a composite target of these metals, an alloy and an oxide; or the like.

The ratio of oxygen atoms (z) in the perpendicular magnetic anisotropic film, which is preferably within a range of 0.05 to 0.50 determined by X-ray photoelectron spectroscopy (XPS) method, can be controlled by the partial pressure of oxygen in the sputtering device. The optimum gas pressure in the sputtering device differs depending on the rate of deposition of the film.

When a perpendicular magnetic anisotropic film is produced under inadequate oxygen partial pressure, a peak of the diffracted X-ray intensity caused by metal states is not sometimes observed in X-ray diffraction spectrum.

The sputtering is carried out under the condition where argon gas pressure is within the range of $1 \times 10^{-3}$ to $1 \times 10^{-2}$ Torr A film-forming rate is not limited.

A perpendicular magnetic anisotropic film formed by means of the above mentioned sputtering has a sufficient saturation magnetization (Ms), an enough perpendicular anisotropic magnetic field (Hk), and a proper perpendicular coercive force (Hc⊥). Those values differ depending on the composition. By the above mentioned sputtering method, a perpendicular magnetic anisotropic film having a saturation magnetization (Ms) of 350 to 1300 [emu/cm$^3$], a perpendicular anisotropic magnetic field (Hk) of 2 to 6 [kOe] and a perpendicular coercive force (Hc⊥) of 200 to 1500 [Oe] can easily be produced in any film thickness.

In the X-ray diffraction spectrum of a perpendicular magnetic anisotropic film produced by the above mentioned sputtering method, there are observed both a peak of diffracted X-ray intensity caused by FeO and a peak of diffracted X-ray inteisity caused by Fe, Co and Metal M in metal states.

A perpendicular magnetic storage medium utilising a perpendicular magnetic anisotropic film produced by the above mentioned method has a high recording/reproducing sensitivity.

The perpendicular magnetic anisotropic film in the present invention can be used in a single layer construction in a storage medium for being recorded/reproduced by a ring head. Further, the film can be used in a double layer construction in a storage medium, wherein a soft magnetic layer is provided between a substrate and the perpendicular magnetic anisotropic film, for being recorded/reproduced by a perpendicular head. When the double layer construction is employed, the perpendicular magnetic anisotropic film in the present invention is not affected by the soft magnetic layer. Therefore, the film in the present invention has a considerable advantage over the convnetional film of Co-Cr alloy even when used in the double layer film construction.

The detailed explanation for the above soft magnetic layer is given hereinafter. The soft magnetic layer is permeable to flux of magnetic induction. The initial magnetic permeability thereof is not lower than 100 and the coercive force is not higher than 10 [Oe] and often around 1 [Oe]. Examples of material of the soft magnetic layer are, for example, (I) a crystalline substance such as pure iron, siicon steel, various Permalloy, CuNi ferrite, Ni-Zn ferrite, Mn-Zn ferrite and Sendust;

(II) an amorphous such as an alloy comprising one among Fe-Co, Co-Zr and Co and one among Ti, Y, Hf, Nb, Ta, W and the like;

(III) an amorphous alloy comprising a transition metal such as Fe, Co and Ni and a metalloid such as Si, B, P and C; and the like. It is one of the great advantages of the present invention that the anisotropy of the perpendicular magnetic anisotropic film is less affected by any material mentioned above used for a soft magnetic layer thereunder. The soft magnetic layer of the above mentioned can be deposited by means of vacuum evaporation method, sputtering method, or the like. The preferable thickness of the soft magnetic layer, which differs depending on the saturation magnetization and the magnetic permeability thereof, is generally 0.05 to 5$\mu$m, and more preferably 0.1 to 1 $\mu$m. Because, the layer thinner than 0.05 $\mu$m can not provide a satisfactory effect of using a soft magnetic layer, and the layer thicker than 5 $\mu$m is uneconomical since it can not enhance the effect.

A substrate for a soft magnetic layer and perpendicular magnetic anisotropic film used in the present invention can, for example, be a metal plate of aluminum, stainless steel or the like; a plastic plate, sheet of film of polyimide, polyester or the like. A substrate having a sottening point of not lower than about 50° C. and a thickness of about 10 $\mu$m to 20 mm can be used in the present invention.

Hereinafter, several embodiments of the present invention are explained.

EXAMPLE 1

Using a rf-magnetron sputtering device, a soft magnetic layer of Permalloy was formed on a polyimide substrate having a thickness of 50 $\mu$m, then on the layer, a perpendicular magnetic anisotropic film of sub-oxides of Fe and Co was formed.

Permalloy target used was a disc of $Fe_{14}Ni_{77}Cu_5Mo_4$ alloy having 6 inch diameter and 1 mm thickness. The distance between the target and the substrate was 7 cm. The argon gas pressure in the atmosphere, wherein the substrate was located, was $5 \times 10^{-3}$ Torr, and the substrate was at a room temperature. After the surface of the target was cleaned by a sufficient pre-sputtering at the sputtering power of 1 kw, a shutter was opened to carry out the sputtering for 10 minutes in order to deposite Permalloy onto the substrate. While deposition was carried out, the substrate was kept rotating above the target at a rate of 10 revolutions per minutes. The obtained soft magent film was partially sampled and the thickness thereof was measured by a styrus step monitor to be found 4900 Å. From a magnetization curve measured by a vibrating-sample-magnetometer, it was found that the perpendicular coercive force was 0.9 [Oe], the saturation magnetization was 550 [emu/cm$^3$] and the initial magnetic permeability was 1100. The magnetic anisotropy of the soft magnetic film was not observed.

Then, the target was replaced by a composite target comprising an Fe plate having 6 inch diameter and 1 mm thickness and small Co plates being placed thereon, and a perpendicular magnetic anisotropic film of suboxides of Fe and Co was formed onto the above soft magnetic film of Permalloy. The argon gas pressure in the atmosphere, wherein the substrate was located, was $3 \times 10^{-3}$ Torr, the added oxygen pressure was $4.5 \times 10^{-4}$ Torr, and the substrate was at a room temeprature. After the surface of the target was cleaned by a sufficient pre-sputtering at a sputtering power of 2 kw, the shutter was opened to carry out the sputtering for 2 minutes in order to form a perpendicular magnetic anisotropic film on to the Permalloy. The thickness of the obtained perpendicular magnetic anisotropic film was measured by a styrus step monitor to be found 1200 Å. The perpendicular magnetic anisotropic film without the Permalloy was sampled and analyzed by X-ray microanalyzer (XMA), then it was found that the ratio (x) of the number of Co atoms to the total number of Fe atoms and Co atoms was 0.33. Further, it was found that the ratio (z) of the number of oxygen atoms to the total number of atoms in the perpendicular magnetic anisotropic film was 0.28 by means of X-ray photoelectron spectroscopy (XPS). The invenstigaton regarding the degree of oxidation of Fe and Co was performed based on the obtained spectrum of XPS, then it was found that appreciable part of Fe (about 50%) was oxidized and most of Co (more than 90%) remained in a metal state.

Figure 10:
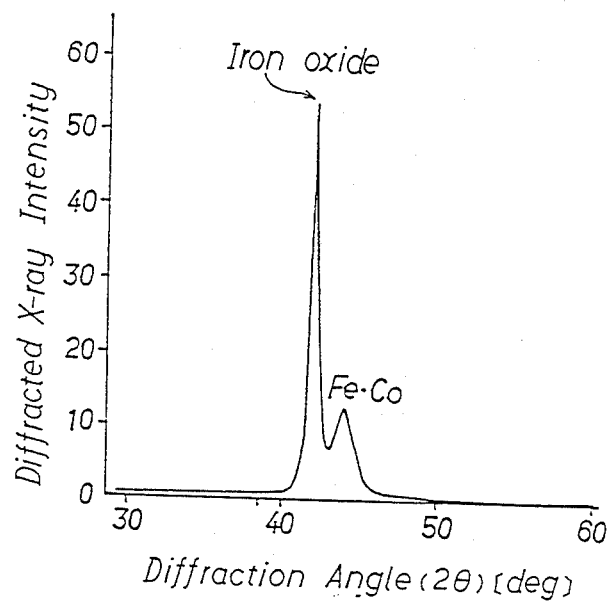
FIG. 10 is a graph showing a result of X-ray diffraction spectrum of a perpendicular magnetic anisotropic film obtained in Example 1.

The result of X-ray diffraction spectrum obtained from the perpendicular magnetic anisotropic film without the Permalloy of the above example is shown in FIG. 10. The X-ray diffraction spectrum was obtained under the condition wherein a X-ray tube having a copper anode was used and an accelerating voltage of 40 kV was selected together with a current of 60 mA. It is presumed that a peak of diffracted X-ray intensity observed adjacently to the diffraction angle $2\theta = 42.0°$ in FIG. 10 is caused by a lattice in FeO having a lattice spacing of 2.13 to 2.16 Å, and another peak observed adjacently to the diffraction angle $2\theta = 44.4°$ in FIG. 10 is caused by a lattice in metal state Fe and Co having a lattice spacing of 2.02 to 2.08 Å.

In FIG. 10, there are recognized both a peak caused by FeO and a peak caused by metal state Fe and Co of diffracted X-ray intensity in X-ray diffraction spectrum of the above example perpendicular magnetic anisotropic film. Therefore, the above Example 1 satisfies the elemental requirement in the microscopic construction of the perpendicular magnetic anisotropic film in the present invention.

Figure 11:
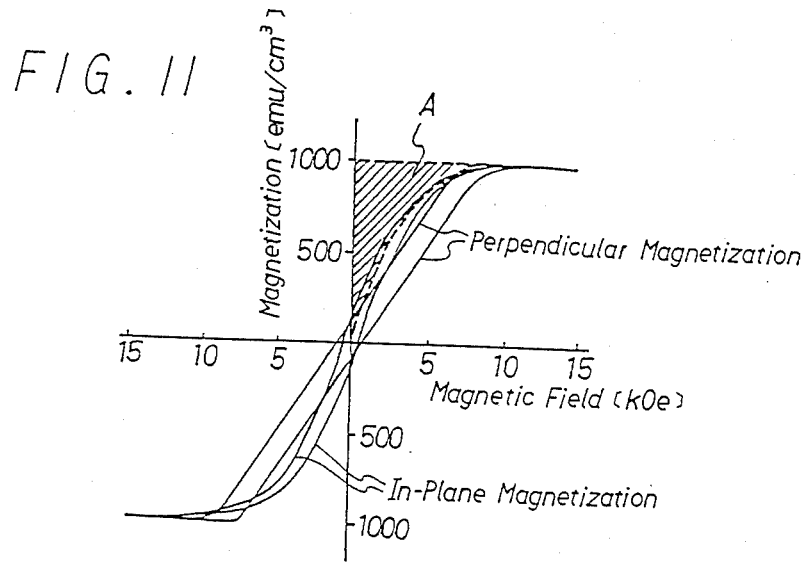
FIG. 11 is a graph showing a magnetization-hysteresis curve of the perpendicular magnetic anisotropic film obtained in Example 1.

FIG. 11 shows a magentic hysteresis curve of the perpendicular magnetic anisotropic film in the above Example 1. It was measured from the perpendicular magnetic anisotropic film in the above example that the saturation magnetization (Ms) was 1000 [emu/cm$^3$] and the perpendicular coercive force (Hc⊥) was 880 [Oe]. The magnetic anisotropic energy Ku derived from the magnetic hysteresis curve was $1.64 \times 10^6$ [erg/cm$^3$]. The magnetic anisotropic energy Ku can be obtained by calculating a hathced area A in FIG. 11 which is enclosed by an inplane initial magnetization curve (shown by a dotted line in FIG. 11), an axis of ordinate which represents the magnetization intensity and a line starting from the point of the saturation magnetization on the axis of ordinate and being parallel to the axis of abscissa which represents the magentic field intensity. The perpendicular anisotropic magnetic field (Hk) calculated by the correlation Hk = 2 Ku/Ms was 3.3 [kOe].

The correlation between a linear recording density and a reproducing output of the perpendicular magnetic storage medium of the above Example 1 was measured by using a tester equipped with a perpendicular magnetic head. The magnetic head was of a type having an auxiliary magnetic pole. The main magnetic pole of the magnetic head had a thickness of 0.3 μm, a width of 200 μm and a coil turns of 50. The driving speed of the perpendicular magnetic storage medium was 2 m/sec and the recording current was 10 mA during the measurement. The obtained correlation between the linear recording density and the reproducing output is illustrated in FIG. 12.

Figure 12:
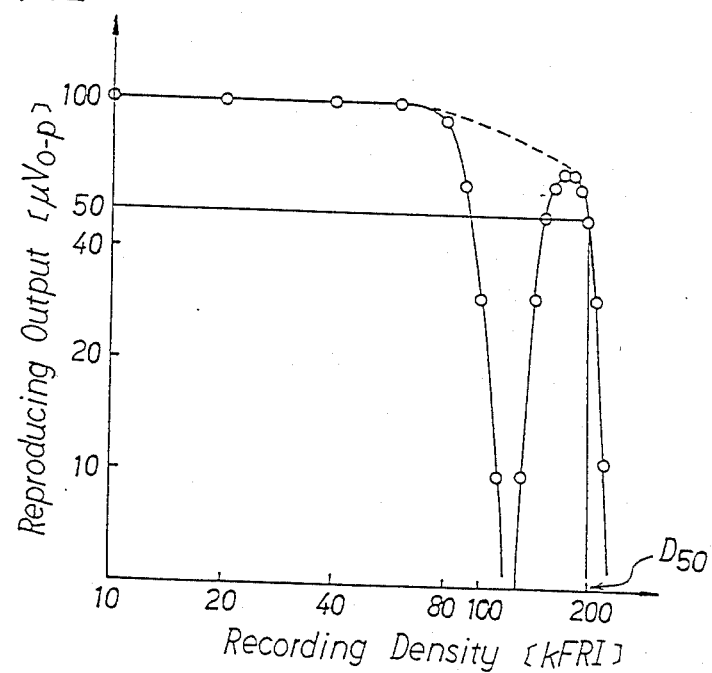
FIG. 12 is a graph showing a recording density/reproducing output characteristic of the perpendicular magnetic storage medium obtained in Example 1.

FIG. 12 shows that the reproducing output of the perpendicular magnetic anisotropic film in the present invention is 100 [μVo−p] at a low linear recording density. This is a very high value of the reproducing output.

FIG. 12 also shows that the recording output is lost at a linear recording density of about 120 [kFRI]. This phenomenon is caused by a loss due to the film thickness of the magnetic head. Here, $D_{50}$ is defined as a linear recording density at which the reproducing output is a half of the output at the above low linear recording density based on the envelope shown by a dotted curve in FIG. 12 with neglecting the above phenomenon. $D_{50}$ of the perpendicular magnetic anisotropi film in the present invention is about 200 [kFRI], which is a very high value. From this result, it is confirmed that Example 1 provides a sufficient reproducing output even at a very high linear recording density of more than 150 [kFRI].

COMPARATIVE EXAMPLE 1

A perpendicular magnetic storage medium having a double layer construction was produced in the same procedure as in Example 1 except that an added oxygen pressure was selected at $4.8 \times 10^{-4}$ Torr. The thickness of the obtained perpendicular magnetic anisotropic film was 1300 Å and the ratio (z) of the number of oxygen atoms to the total number of atoms in the film measured by XPS method was 0.35. By measuring the magnetic characteristics of the perpendicular magnetic anisotropic film of Comparative Example 1, it was found that the saturation magnetization (Ms) was 420 emu/cm$^3$, the perpendicular coercive force (Hc⊥) was 450 Oe, the perpendicular anisotropic magnetic field (Hk) was 4.0 KOe, and accordingly the film had a satisfactory mangetic characteristics.

However, the result of the X-ray diffraction spectrum of Comparative Example 1 was different from that of Example 1. Namely, although a peak of the diffracted X-ray adjacent to a diffraction angle $2\theta=42.0°$ caused by FeO was observed, a peak adjacent to a diffraction angle $2\theta=44.4°$ caused by metal state Fe and Co was not observed.

The correlation between a linear recording density and a reproducing output was invenstigaged by the same method as used in Example 1. The measured reproducing output at a low linear recording density was 25 [$\mu V_{o-p}$] and $D_{50}$ was 80 [kFRI]. Therefore, Comparative Example 1 could not provide a sufficient recording/reproducing sensitivity. The reason is presumed that Comparative Example 1 does not satisfy the previously mentioned requirement in the microscopic construction.

EXAMPLE 2

A perpendicular magnetic storage medium was produced in the same procedure as Example 1 except that a compositional ratio of Fe and Co was modified.

The obtained perpendicular magnetic aniotropic film of Example 2 had a thickness of 1200 Å. The ratio (x) of the number of Co atoms to the total number of Fe atoms and Co atoms analyzed by XMA method was 0.55, and the ratio (z) of the number of oxygen atoms to the number of atoms in the film measured by XPS method was 0.19. The degrees of ionizations of Fe and Co were determined from the XPS spectrum as shown by the spectrum C in FIG. 7a and FIG. 7b, respectively. In Example 2, about 40% of Fe was oxidized and more than 90% of Co remained in a metal state. This result corresponds to the column $z=0.19$ in Table 1.

Magnetic properties of the perpendicular magnetic anisotropic film of Example 2 correspond to the values of $z=0.19$ in FIG. 8. The saturation magnetization (Ms) was 600 [emu/cm$^3$], the perpendicular coercive force (Hc⊥) was 500 [Oe] and the perpendicular anisotropic magnetic field (Hk) was 5 [kOe].

A contacting angle, kinetic friction coefficient and wear resistance were measured. The contacting angle was measured by using water as described, for example, in Shin-jikkenkagaku-kouza, Vol. 18, Interface and Colloid, pp 93-106, 1977 published by Maruzen Kabushiki Kaisha. The kinetic friction coefficient was measured in accordance with ASTM-D3028 method. In this measurement, the sample was fixed on a turn table and there were used a Westover type frictiono meter and a fixed sample of a heat-resistant glass disc grinded by an abrasive cloth having a particle size of 0.3 $\mu$m. And the kinetic friction coefficient mentioned here was a value at 30 seconds after starting to rotate the sample under the condition wherein the vertical load of 50 kgw and rotating speed of 50 cm/sec were selected. The wear resistance was investigated subsequent to the kinetic friction coefficient measurement by inspecting the surface of the sample after 1000 revolutions of the turn table. As a result of the above measurements, it was found that the contacting angle was 64.1°, the kinetic friction coefficient was 0.34 and the surface was not damaged. In a similar measurement for the conventional perpendicular magnetic anisotropic film of Co-Cr alloy, it was found that the contacting angle was about 45°, the kinetic friction coefficient was 0.5 to 0.6 and the surface was heavily damaged in case of the above conventional film. Therefore, it is apparent that the film in the present invention has great advantages over the conventional one.

The result of the X-ray diffraction spectrum of Example 2 is shown as a spectrum (D) in FIG. 9. In the spectrum, both a peak caused by FeO and a peak caused by metal state Fe and Co are recognized.

A test similar to that described in Example 1 was carried out to determin the recording/reproducing sensitivity of the perpendicular magnetic storage medium of Example 2. The reproducing output at a low linear recording density was 100 [$\mu V_{O-p}$] and $D_{50}$ was 200 [kFRI]. The result proved that the recording/reproducing sensitivity of Example 2 was satisfactory.

EXAMPLE 3

A perpendicular magnetic storage medium of Example 3 was produced in the same procedure as Example 1 except that a polyethylene terephthalate (PET) substrate of 75 $\mu$m thickness was used instead of the polyimide substrate of 50 $\mu$m thickness and a compositional ratio of Fe and Co was modified.

Figure 13A:
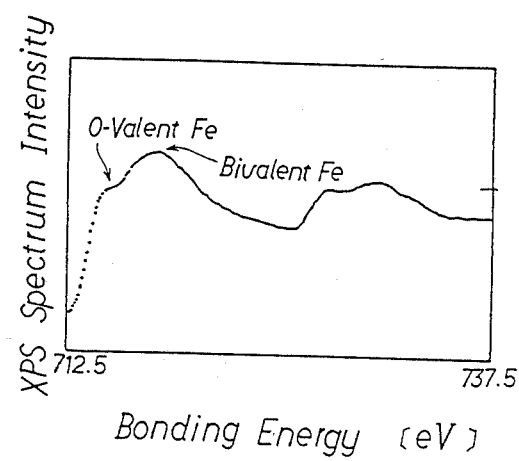
FIG. 13a is a graph showing a result of spectrum analysis of Fe, by means of XPS method, caused by 2P electron orbit of a perpendicular magnetic anisotropic film obtained in Example 3.
Figure 13B:
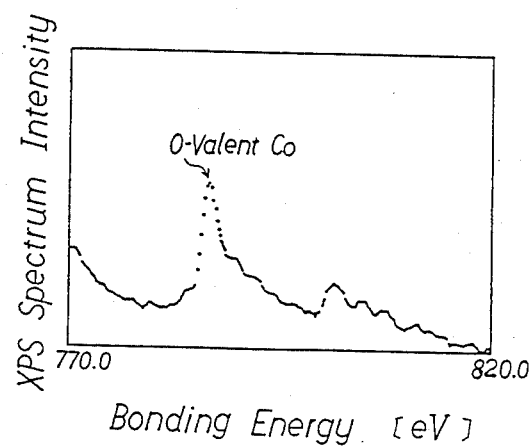
FIG. 13b is a graph showing a result of spectrum analysis of Co, by means of XPS method, caused by 2P electron orbit of the perpendicular magnetic anisotropic film obtained in Example 3.

The obtained perpendicular magnetic anisotropic film had a thickness of 1200 Å. The ratio (x) of the number of Co atoms to the total number of Fe atoms and Co atoms analyzed by XMA method was 0.10, and the ratio (z) of the number of oxygen atoms to the number of atoms in the film measured by XPS method was 0.35. The result of the analysis by means of XPS method is shown in FIG. 13a and FIG. 13b. From these figures, it can be known that most of Fe is in FeO and the residual Fe and Co remain in a metal state.

The magnetic properties of the perpendicular magnetic anisotropic film of Example 3 were investigated by the same method as in Example 1. The saturation magnetization (Ms) was 580 [emu/cm$^3$], the perpendicular coercive force (Hc⊥) was about 700 [Oe] and the perpendicular anisotropic magnetic field (Hk) was 4.0[kOe].

In the X-ray diffraction spectrum of Example 3, both a peak caused by FeO and a peak caused by metal state Fe and Co were recognized.

Further, a test similar to that described in Example 1 was carried out to determine the recording/reproducing sensitivity of the perpendicular magnetic stronger medium of Example 3. The recording output at a lower linear recording density was 100 [$\mu V_{o-p}$] and $D_{50}$ was 200 [KFRi]. The results proved that the recording/reproducing sensitivity of Example 3 was satisfactory.

COMPARATIVE EXAMPLE 2

A soft magnetic layer of Permalloy was formed on a polyimide substrate having 50 $\mu$m thickness in the same procedure as in Example 1. The magnetic properties of the obtained soft magnetic layer were similar to that of Example 1.

Then, using a DC magnetron sputtering equipment, a perpendicular magnetic anisotropic film of a sub-oxide of Fe-Co was formed on the soft magnetic layer by using the same composite target as used in Example 1. The argon gas pressure in the atmosphere, wherein the substrate was located, was $3\times10^{-3}$ Torr, the added oxygen pressure was $7.6\times10^{-4}$ Torr, and the substrate was at a room temperature. After the surface of the target was cleaned by a sufficient pre-sputtering at a sputtering power of 900 w, a shutter was opened to carry out the sputtering for 4 minutes in order to form a perpendicular magnetic anisotropic film on to the Permalloy. The thickenss of the formed perpendicular magnetic anisotropic film was measured by a sytrus step monitor to be found 1500 Å.

The perpendicular magnetic anisotropic film without the Permalloy was sampled and analyzed by XMA method, then it was found that the ratio (x) of the number of Co atoms to the total number of Fe atoms and Co atoms was 0.33. Further it was found that the ratio (z) of the number of oxygen atoms to the total number of atoms in the perpendicular magnetic anisotropic film was 0.30 by means of XPS method. The invenstigation regarding the degree of oxidation of Fe and Co was performed based on the obtained spectrum of XPS, then it was found that some of Fe (about 50%) was oxidized and most of Co (more than 90%) remained in a metal state.

By measuring the magnetic characteristics of the perpendicular magnetic anisotropic film of Comparative Example 2, it was found that the saturation magnetization (Ms) was 700 emu/cm$^3$, the perpendicular coercive force (Hc⊥) was 500 Oe, the perpendicular anisotropic magnetic field (Hk) was 3.5 kOe and accordingly the film had a satisfactory magnetic characteristics.

However, the result of the X-ray diffraction spectrum of this Comparative Example 2 was different from the result of Example 1. Namely, neither a peak of the ( diffracted X-ray being presumed to be caused by cubic crystalline FeO nor a peak being presumed to be caused by metal state Fe and Co were observed.

The correlation between the linear recording density and the reproducing output was investigated by the same method as used in Example 1. The measured reproducing output at a low linear recording density was 20 [μVo-p] and D$_{50}$ was 70 [kFRI].

EXAMPLES 4–9 AND COMPARATIVE EXAMPLES 3–5

Eight perpendicular magnetic storage mediums i.e. Examples 5 to 9 and Comparative Examples 3 to 5 were produced. In each production, a perpendicular magnetic anisotropic film was formed on a glass substrate having a thickness of 1 mm. The perpendicular magnetic anisotropic films comprise sub-oxides of metal mixtures wherein one kind of metal among Al, Cr, Mo, Ti and Zr was added in a different ratio (y) to Fe and Co. The targets used were composite targets comprise an Fe disc having a diameter of 3 inches and a thickness of 0.5 mm, small Co plates having a dimension of 10 mm square and small plates of Al, Cr, Mo, Ti or Zr having a dimension of 10 mm square. The distance between the substrate and the target was 5 cm. The argon gas pressure in the atmosphere where the substrate was located was 3×10$^{-3}$ Torr, the added oxygen pressure was 4.5×10$^{-4}$ Torr and the substrate was at a room temperature. After the surface of the target was cleaned by a sufficient presputtering, a shutter was opened to carry out the sputtering for 1 minute at a sputtering power of 400 W in order to form a perpendicular magnetic anisotropic film on the substrate.

Further, for the comparison with Example 5, a perpendicular magnetic storage medium of Example 4 was produced wherein a perpendicular magnetic anisotropic film of sub-oxide of only Fe and Co was formed in the same manner as in Examples 5 to 9.

The thicknesses of the obtained films of Examples 4 to 9 and Comparative Examples 3 to 5 were measured by a styrus step monitor, and the compositions thereof were determined by the X-ray photoelectron spectrum (XPS) method and the X-ray microanalysis (XMA) method. The saturation magnetization (Ms) and the perpendicular coercive force thereof were measured by vibrating-sample-magnetometer.

The results of the above measurement for Examples 4 to 9 and Comparative Examples 3 to 5 are shown in Table 2.

From Table 2, it is found that a perpendicular magnetic anisotropic film containing the metal M of more than 30 atm % has a too low perpendicular coercive force and negligibly low perpendicular magnetic anisotropy.

As the result of the X-ray diffraction spectra of the perpendicular magnetic anisotropic films of Examples 4 to 9, both peaks caused by FeO and peaks caused by metal state Fe and Co were recognized in all samples.

Figure 14:
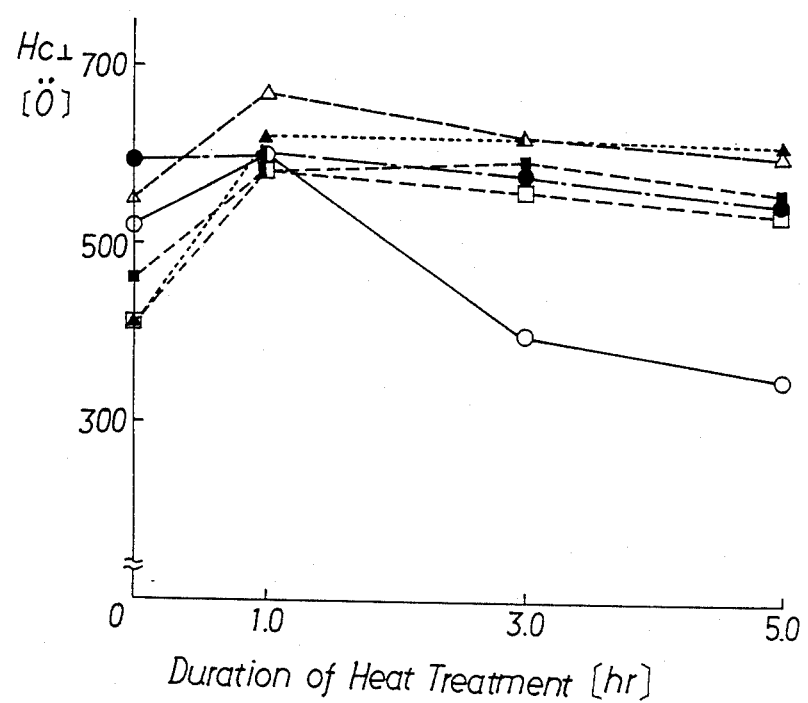
FIG. 14 is a graph showing a relationship between a perpendicular coercive force (Hc⊥) and a heattreating time in the air of 240° C. with respect to a perpendicular magnetic anisotropic film in Examples 4 to 9 wherein a content of additional metal is less than 30 atomic % to a total amount of metal component.

Next, the perpendicular magnetic anisotropic films of Examples 4 to 9 were heat-treated at 240° C. in the atmosphere, then the oxidation resistances thereof were investigated. The correlations between the duration time of the heat-treatment and the perpendicular coercive forces (Hc⊥) of the perpendicular magnetic anisotropic films are shown in FIG. 14. The correlations between the duration time of the heat-treatment and the perpendicular anisotropic magnetic fields (Hk) are shown in FIG. 15.

Figure 15:
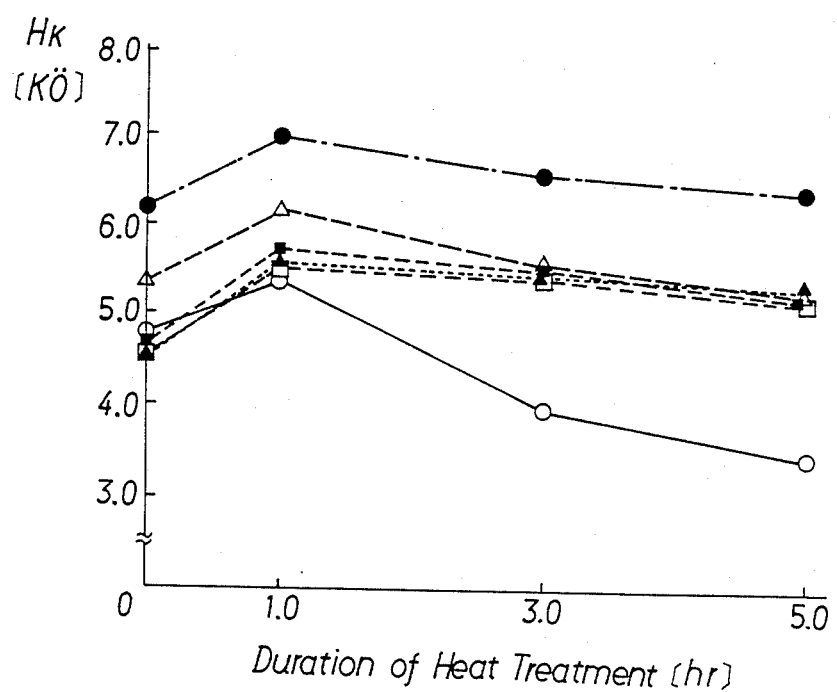
FIG. 15 is a graph showing a relationship between a perpendicular anisotropic magnetic field (Hk) and a heat-treating time in the air of 240° with respect to the perpendicular magnetic anisotropic film as in FIG. 14.

From FIG. 14 and FIG. 15, it is found that to add the metal M to Fe and Co improves the oxidation resistance of the perpendicular magnetic anisotropic film.

EXAMPLE 10

A perpendicular magnetic storage medium of Example 10 was produced in the same procedure as Example 1 except that there was used a composite target of Fe plate having a diameter of 6 inches and a thickness of 1 mm and small plates of Co and Ti disposed thereon in the deposition of the perpendicular magnetic anisotropic film.

The obtained perpendicular magnetic anisotropic film had a thickness of 1200 Å. The ratio (x) of the number of Co atoms to the total number of Fe atoms and Co atoms analyzed by XMA method was 0.30, the ratio (y) of Ti atoms analyzed by XMA method was 0.08 and the ratio (z) of the number of oxygen atoms to the number of atoms in the film measured by XPS method was 0.31.

The magnetic properties of the perpendicular magnetic anisotropic film of Example 10 were investigated. The saturation magnetization (Ms) was 710 [emu/cm$^3$], the perpendicular coercive force (Hc⊥) was about 580 [Oe] and the perpendicular anisotropic magnetic field (Hk) was 6.2 [kOe].

In the X-ray diffraction spectrum of Example 10, both a peak caused by FeO and a peak caused by metal state Fe and Co were recognized.

Further, a test similar to that described in Example 1 was carried out to determine the recording/reproducing sensitivity of the perpendicular magnetic storage medium of Example 10. The recording output at a low linear recording density was 100 [μV$_{o-p}$] and D$_{50}$ was 200 [kFRI].

TABLE 2

| Sample No. | Film thickness [Å] | Composition [(Fe$_{1-x}$Co$_x$)$_{1-y}$M$_y$]$_{1-z}$O$_z$ [ratio in atom] | | | | Magnetic properties | | |
|---|---|---|---|---|---|---|---|---|
| | | M; y | 1 − x | x | z | Hc⊥[Oe] | Hk[kOe] | Ms[emu/cm$^3$] |
| (Ex-4) | 2,000 | — | 0.65 | 0.35 | 0.28 | 520 | 4.8 | 600 |
| (Ex-5) | 1,500 | Cr; 0.06 | 0.70 | 0.30 | 0.30 | 550 | 5.4 | 490 |
| (Ex-6) | 2,000 | Ti; 0.08 | 0.70 | 0.30 | 0.32 | 590 | 6.2 | 720 |
| (Ex-7) | 2,500 | Al; 0.08 | 0.71 | 0.29 | 0.30 | 410 | 4.6 | 790 |
| (Ex-8) | 2,500 | Mo; 0.08 | 0.71 | 0.29 | 0.30 | 410 | 4.6 | 700 |
| (Ex-9) | 2,000 | Zr; 0.08 | 0.71 | 0.29 | 0.31 | 470 | 4.7 | 750 |
| (CEx-3) | 2,000 | Cr; 0.34 | 0.74 | 0.26 | 0.25 | 150 | low | |
| (CEx-4) | 2,000 | Ti; 0.34 | 0.60 | 0.40 | 0.24 | 30 | low | |
| (CEx-5) | 2,000 | Al; 0.32 | 0.70 | 0.30 | 0.36 | 180 | low | |

Ex: Example
CEx: Comparative Example

The perpendicular magnetic storage medium of the present invention can utilize a low heat-resistant and inexpensive substrate because the film production thereof can be performed at a relatively low temperature compared with a conventional medium using a Co-Cr perpendicular magnetic anisotropic film. Therefore, a high density perpendicular magnetic storage medium can be produced at low cost.

Further, since the perpendicular magnetic anisotropic film in the present invention has an oxidized surface, a perpendicular magnetic storage medium having a sufficient wear resistance without additional surface protection is provided.

Still further, since the perpendicular magnetic anisotropic film in the present invention utilizes a sub-oxide having a composition being suitably selected for the specific use, a perpendicular magnetic storage medium having high saturation magnetization and perpendicular magnetic anisotropy and a proper perpendicular coercive force is provided.

The perpendicular magnetic anisotropic film in accordance with the present invention has a microscopic construction wherein both a peak of the diffracted X-ray intensity being presumed to be caused by FeO and a peak being presumed to be caused by metal state Fe and Co and Metal M are observed in X-ray diffraction spectrum. By virtue of that, the perpendicular magnetic storage medium of the present invention has much higher recording/reproducing sensitivity than the conventional perpendicular magnetic storage medium using a sub-oxide of Fe-Co in the different microscopic construction.

Further, the perpendicular magnetic storage medium containing an additional metal which is at least one among Al, Cr, Mo, Ti, Zr and the like excluding Fe and Co, in order to provide an improved oxidation resistance compared with a perpendicular magnetic storage medium having a perpendicular magnetic anisotropic film of a sub-oxide of Fe-Co only. To add the above metal i.e. Al, Cr, Mo, Ti, Zr or the like to Fe and Co does not degrade the magentic properties i.e., the saturation magnetization, the perpendicular magnetic anisotropy, the wear resistance or the like of the perpendicular magnetic anisotropic film.

Still further, when a double layer construction, wherein a soft magnetic layer is provided as a base of the perpendicular magnetic anisotropic film, is applied to the perpendicular magnetic storage medium in order to enhance the recording/reproducing sensitivity of the medium, the perpendicular magnetic anisotropic film in accordance with the present invention requires less reciprocal restrictions between the soft magnetic layer and the film itself.

What is claimed is:

1. A perpendicular magnetic storage medium comprising a substrate and a perpendicular magnetic anisotropic film formed on the substrate, characterized in that the perpendicular magnetic anisotropic film is a film consisting of a sub-oxide of a metal having a composition which is described by a general formula [(Fe$_{1-x}$Co$_x$)$_{1-y}$M$_y$]$_{1-z}$O$_z$, wherein $0.01 \leq x \leq 0.75$, $0.001 \leq y \leq 0.30$, $0.05 \leq z \leq 0.50$ and M means at least one metal selected from the group consisting of Al, Cr, Mo, Ti and Zr, wherein the concentration of M at the surface of the film is more than 1 atom %; said film having an easy magnetization axis perpendicular to the plane of the film and an X-ray diffraction spectrum having both a peak of diffracted X-ray intensity caused by oxidized Fe and a peak of diffracted X-ray intensity caused by metal state Fe and Co and M.

2. The method of claim 1, wherein more than 80% of Co remains in a metal state and more than 30% of Fe is in FeO.

3. The medium of claim 1, wherein the perpendicular magnetic anisotropic film has a saturation magnetization not less than 350 emu/cm$^3$.

4. The medium of claim 2, wherein the perpendicular magnetic anisotropic film has a saturation magnetization not less than 350 emu/cm$^3$.

5. The medium of claim 1, wherein the perpendicular magnetic anisotropic film is a film formed by rf-sputtering or by rf-magnetron sputtering.

6. The medium of any one of claims 1, 2, 3, 4, or 5, wherein a soft magnetic layer having an initial magnetic permeability of not less than 100 and a coercive force of not more than 10 Oe is formed between the substrate and the perpendicular magnetic anisotropic film.

* * * * *

UNITED STATES PATENT AND TRADEMARK OFFICE
CERTIFICATE OF CORRECTION

PATENT NO. : 4,797,330

DATED : January 10, 1989

INVENTOR(S) : Shogo NASU et al

It is certified that error appears in the above-identified patent and that said Letters Patent is hereby corrected as shown below:

Column 2, line 25, "perpendicuarly" should read --perpendicularly--;
line 33, "sbstrate" should read --substrate--.

Column 3, line 16, "axis bein" should read --axis being--.

Column 4, line 60, "$[(Fe_{1-x}Co_x)_{1-y}]_{1-z}O_z$" should read --$[(fe_{1-x}Co_x)_{1-y}M_y]_{1-z}O_z$--.

Column 6, line 3, "0-valent" should read --O-valent--;
line 9, "0-valent" should read --O-valent--;
line 10, "Al" should read --$A_1$--;
line 12, "Bl" should read --$B_1$--.

Column 8, line 49, "X-ray intensit" should read --X-ray intensity--.

Column 9, line 51, "Torr A" should read --Torr. A--.

Column 10, line 1, "inteisity" should read --intensity--;
line 29, "siicon" should read --silicon--;
line 57, "sottening" should read --softening--.

Column 11, line 14, "styrus" should read --stylus--;
lines 30 - 31, "temeprature" should read --temperature--;
line 37, "styrus" should read --stylus--;
line 46, "invenstigaton" should read --investigation--.

Column 12, line 14, "hathced" should read --hatched--;
line 49, "anisotropi" should read --anisotropic--.

UNITED STATES PATENT AND TRADEMARK OFFICE
CERTIFICATE OF CORRECTION

PATENT NO. : 4,797,330

DATED : January 10, 1989

INVENTOR(S) : Shogo NASU et al

It is certified that error appears in the above-identified patent and that said Letters Patent is hereby corrected as shown below:

Column 13, line 2, "KOe" should read --kOe--;
lines 2 - 3, "mangetic" should read --magnetic--;
line 26, "aniotropic" should read --anisotropic--;
line 53, "grinded" should read --ground--;
line 57, "50 kgw" should read --50 gw--.

Column 14, line 13, "[µ Vo-p] and D50" should read --[µ Vo-p] and $D_{50}$--;
line 49, "200[KFRi] should read --200[kFRI]--;
line 67, "900 w" should read --900 W--.

Column 15, line 3, "styrus" should read --stylus--.

Column 16, line 14, "30 atm %" should read --30 atomic %--;
line 15, "neglegibly" should read --negligibly--.

Signed and Sealed this

Seventeenth Day of October, 1989

Attest:

DONALD J. QUIGG

Attesting Officer

Commissioner of Patents and Trademarks